United States Patent [19]

Okada

[11] Patent Number: 5,031,738

[45] Date of Patent: Jul. 16, 1991

[54] MOTOR VEHICLE BRAKE SYSTEM

[75] Inventor: Masaki Okada, Yokohama, Japan

[73] Assignee: Isuzu Ceramics Research Institute Co., Ltd., Fujisawa, Japan

[21] Appl. No.: 440,248

[22] Filed: Nov. 22, 1989

[30] Foreign Application Priority Data

Nov. 25, 1988 [JP] Japan .................................. 63-297347

[51] Int. Cl.[5] ........................ F16D 67/02; B60K 41/26
[52] U.S. Cl. .................................. 192/4 B; 192/12 A; 475/248; 188/291
[58] Field of Search ............. 192/4 B, 12 A; 188/291; 475/248

[56] References Cited

U.S. PATENT DOCUMENTS

| 1,312,856 | 8/1919 | Leonard | 475/248 X |
| 1,901,276 | 3/1933 | Adams | 475/250 X |
| 2,787,170 | 4/1957 | Förster | 192/4 B |
| 3,060,765 | 10/1962 | Rinsoz | 475/248 X |
| 3,326,339 | 6/1967 | Suri | 192/4 B |

Primary Examiner—Allan D. Herrmann
Assistant Examiner—Andrea Pitts
Attorney, Agent, or Firm—Staas & Halsey

[57] ABSTRACT

A differential includes a planet gear through which two shafts coupled to laterally spaced road wheels of a motor vehicle are interconnected. The planet gear has a rotatable shaft with a brake mechanism coupled thereto. A braking force produced by the brake mechanism is transmitted through the differential to the road wheels depending on the rotational speeds of the road wheels. The brake mechanism may include either a turbine for producing a resistive force upon rotation thereof or a hydraulic damper comprising a hydraulic pump and a variable restriction.

3 Claims, 4 Drawing Sheets ion with the accompanying drawings in which preferred embodiments of the present invention are shown by way of illustrative example.

MOTOR VEHICLE BRAKE SYSTEM

BACKGROUND OF THE INVENTION

The present invention relates to a brake system on a motor vehicle for braking a pair of laterally spaced road wheel thereof which are coupled to each other through a differential.

Various brake mechanisms have heretofore been employed in combination with laterally spaced road wheels of motor vehicles. The brake mechanisms associated with the respective laterally spaced road wheels should produce well balanced braking forces which will be applied to the road wheels. If these braking forces were out of balance, the road wheels would be braked with braking forces of different intensity and the motor vehicle could not be braked properly. Therefore, a relatively complex maintenance procedure including a number of adjusting steps has been required to keep the brake mechanisms well balanced.

For high-speed and efficient transportation of goods, there are used many articulated trucks comprising a trailer for carrying a load and a tractor for hauling the trailer, the tractor being equipped with a drive power unit such as an engine.

The height and length of trailers are limited within certain dimensions according to traffic regulations. In order for the trailers to carry a maximum amount possible of cargo, therefore, the tires of the trailers should be of a minimum size required.

Since no drive power unit is mounted on a trailer, brake mechanisms for braking the independently rotatable, laterally spaced road wheels on the trailer are necessarily of limited dimensions. With the brake mechanisms thus dimensionally limited, the brake linings used in the brake mechanisms tend to wear soon, i.e., have a short service life, and therefore must be replaced at short intervals.

SUMMARY OF THE INVENTION

According to the present invention, a differential includes a planet gear through which two shafts coupled to laterally spaced road wheels of a motor vehicle are interconnected, and the plant gear has a rotatable shaft with a brake mechanism coupled thereto. A braking force produced by the brake mechanism is transmitted through the differential to the road wheels depending on the rotational speeds of the road wheels. A single brake system including the above brake mechanism is enough for braking the road wheels. Heretofore, however, each of the road wheels has been associated with its own brake mechanism.

The brake system of the present invention is free of the conventional problem that it is difficult to keep the braking forces applied to the road wheels well in balance. The brake system of the invention is also advantageous in that it is not subject to limitations on location and size. Therefore, a maintenance procedure for the brake system is simplified, and consumable parts of the brake system will be replaced at longer intervals.

The brake system may comprise a turbine or a hydraulic pump for generating a resistive force which can be used as a braking force. With the turbine or hydraulic pump employed, no consumable parts are required by the brake system, so that the brake system maintenance can be performed in a reduced number of steps.

The above and other objects, features and advantages of the present invention will become more apparent

DETAILED DESCRIPTION OF THE PREFERRED EMBODIMENTS

Figure 1:
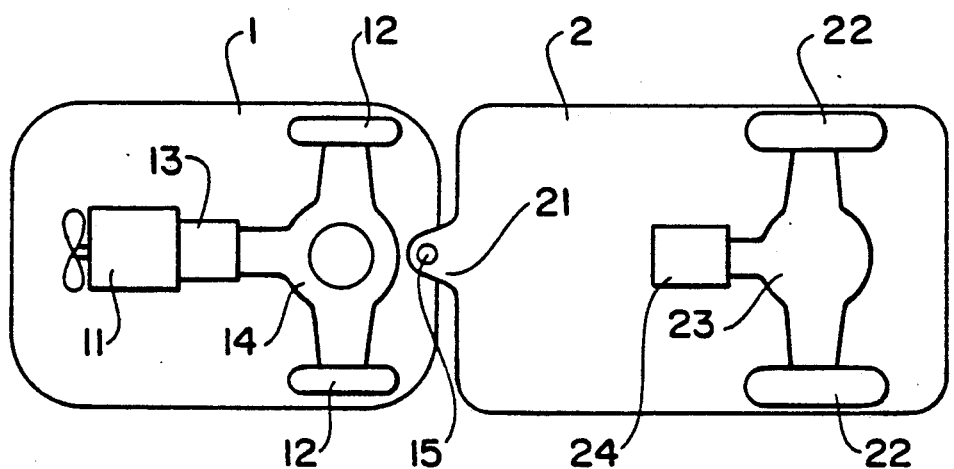
FIG. 1 is a schematic view of a motor vehicle brake system according to an embodiment of the present invention.

FIG. 1 schematically shows a motor vehicle brake system according to an embodiment of the present invention.

An articulated motor vehicle shown in FIG. 1 includes a tractor 1 with an engine 11 mounted thereon, and a trailer 2 connected to the rear end of and hauled by the tractor 1. Road wheels rotatably supported on the tractor 1 are driven by the torque produced by the engine 11 to pull the trailer 2.

Rotative power from the engine 11 is changed in speed by a gear transmission 13 and then transmitted through a differential 14 to the road wheels 12.

Figure 3A:
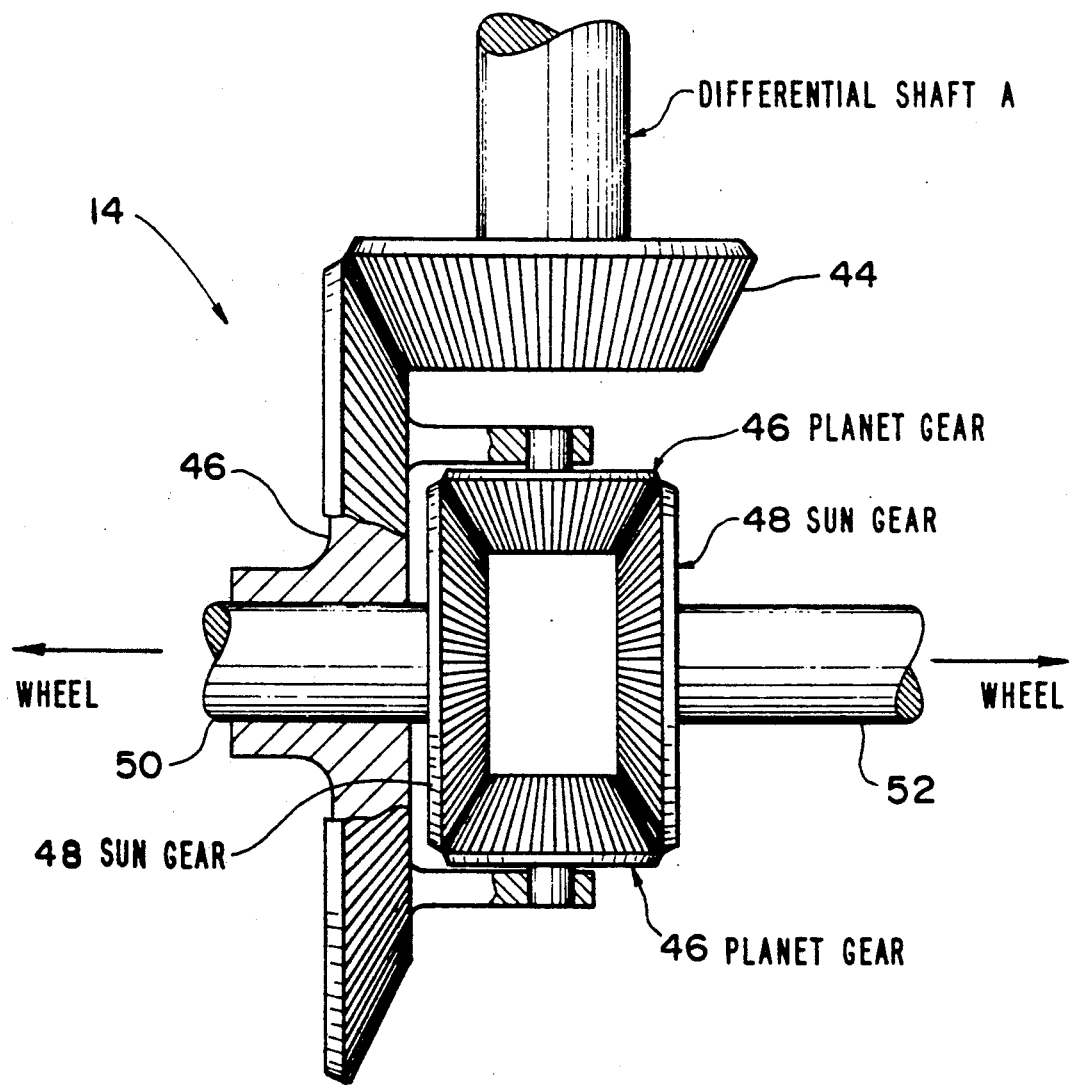
FIG. 3(a) is a plan view of a known differential mechanism to which the present invention may be coupled.

As shown in FIG. 3(a), the differential 14 is of a known construction and includes a speed reducer mechanism which comprises a drive pinion 44 to which the torque from the engine 11 is transmitted by differential shaft A and a ring gear 46 meshing with the drive pinion 44, and a differential mechanism comprising a differential pinion 44 coupled by rotatable shafts to the ring gear 46 and serving as planet gear 48, and side gears coupled as sun gears to axle shafts 50 and 52 of the road wheels 12. The differential 14 splits the torque transmitted from the engine 1 to the drive pinion and transmits the split torques to the road wheels 12 through the side gears 54, depending on the difference between rotational speeds of the road wheels 12 when the motor vehicle makes a turn or runs on rough terrain. Each of the road wheels 12 is associated with a brake mechanism.

The trailer 2 has a coupling 21 on its front end which engages a pin 15 on the rear end of the tractor 1. The trailer 2 is hauled by the tractor 1 through the coupling 21.

The trailer 2 has a pair of laterally spaced road wheels 22 interconnected by a differential 23 which is identical in structure to the differential 14 on the tractor 1. The road wheels 22 are connected to the respective side gears of the differential 23. A brake mechanism 24 is mounted on the rotatable shaft of the drive pinion of the differential 23.

Figure 2:
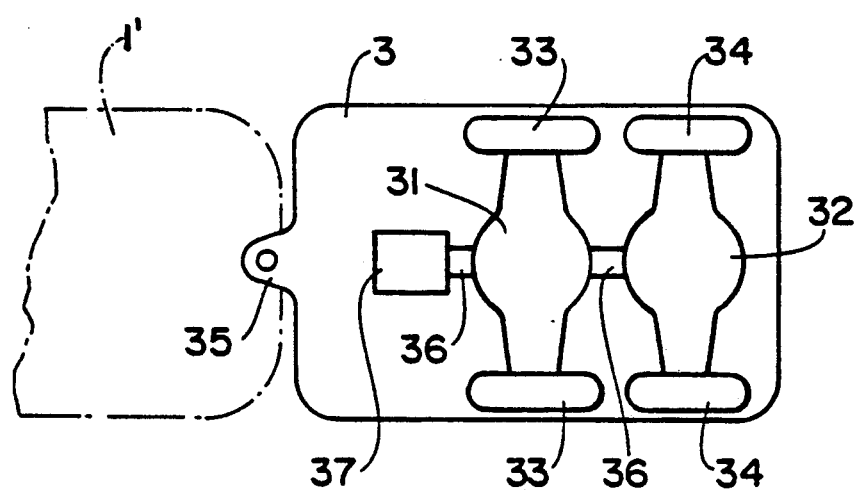
FIG. 2 is a schematic view of a motor vehicle brake system of the invention which is incorporated in a two-axle motor vehicle.

FIG. 2 schematically illustrates a two-axle trailer 3 which incorporates a brake system of the present invention. The trailer 3 has two differentials 31, 32, a pair of laterally spaced road wheels 33 interconnected by the differential 31, and a pair of laterally spaced road wheels 34 interconnected by the differential 32. The trailer 3 is hauled by a tractor 1' similar to the tractor 1 (FIG. 1) through a coupling 35.

The differentials 31, 32 are structurally identical to the differential 23 (FIG. 1) and have drive pinions whose rotational shafts are connected to a two-axle drive shaft 36. A brake mechanism 37, which is identical in construction to the brake mechanism 24 (FIG. 1), is mounted on one end of the drive shaft 36.

The brake mechanism 24 will be described in detail below. The brake mechanism 37 will not be described as it is identical to the brake mechanism 24.

Figure 3:
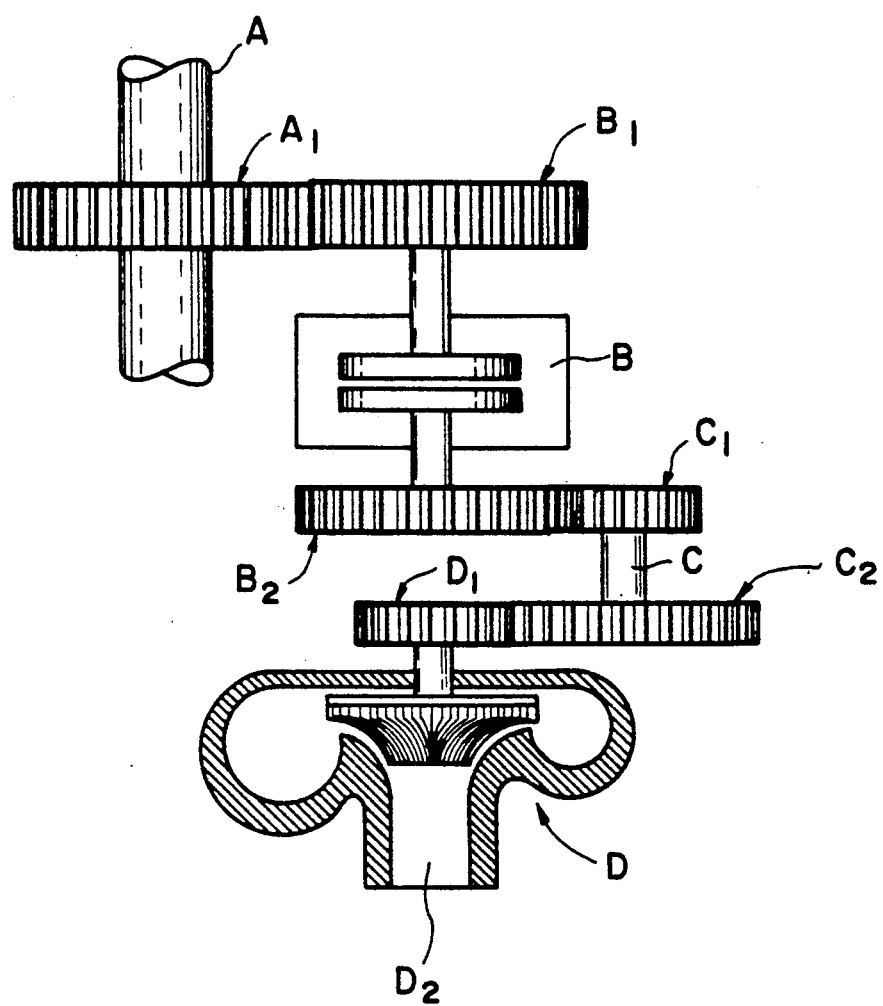
FIG. 3 is a view of a plan brake mechanism according to the present invention.

FIG. 3 shows the brake mechanism 24 in detail. A shaft A to be braked, corresponding to the rotational shaft (differential shaft) of the drive pinion of the differential 23, supports a gear A1 thereon.

The brake mechanism 24 has a friction clutch mechanism B for selectively connecting and disconnecting the rotational shaft of a gear B1 meshing with the gear A1 and the rotational shaft of a gear B2. The gear B2 is held in mesh with a gear C1 which has a smaller number of gear teeth than the gear B2. The gear C1 is coaxially coupled to a gear C2 through an idler shaft C. The gear C2 has a larger number of gear teeth than the gear C1.

A turbine D serves to compress air introduced from an inlet port D2 and discharge the compressed air. The turbine D has a rotational shaft on which a gear D1 is mounted. The gear D1 is held in mesh with the gear C2 and has a smaller number of gear teeth than the gear C2.

The brake mechanism 24 operates as follows:

The trailer 2 coupled to the tractor 1 through the coupling 21 runs by being hauled by the tractor 1. To brake the motor vehicle while it is running, the brake mechanisms associated with the road wheels 12 are operated, and the brake mechanism 24 on the trailer 2 is also operated.

More specifically, the clutch mechanism B is engaged, and rotative power transmitted from the shaft A which is rotating is increased in speed by the gear mechanism shown in FIG. 3 and applied to the turbine D to drive the turbine D. The rotatable shaft of the turbine D is rotated to rotate the impeller of the turbine D. The rotating impeller produces a resistive force which is then amplified by the gear mechanism of the brake mechanism, and the amplified resistive force is applied as a braking force to the shaft A. The braking force acting on the shaft A, i.e., the rotatable shaft of the drive pinion of the differential 23, is transmitted through the differential 23 to the road wheels 22 depending on the rotational speeds of the road wheels 22.

Therefore, even when the motor vehicle is braked while it is making a turn or running on rough terrain, smooth braking forces are applied to the respective road wheels 22 according to the difference between the rotational speeds of the road wheels 22.

To brake the two-axle trailer 3 shown in FIG. 2, the two-axle drive shaft 36 is braked by the brake mechanism 37, thereby transmitting braking forces to the road wheels 33 through the differential 31 and to the road wheels 34 through the differential 32. The tractor 1 or 1' is decelerated by the braking forces applied to the road wheels 12 by their associated brake mechanisms.

Figure 4:
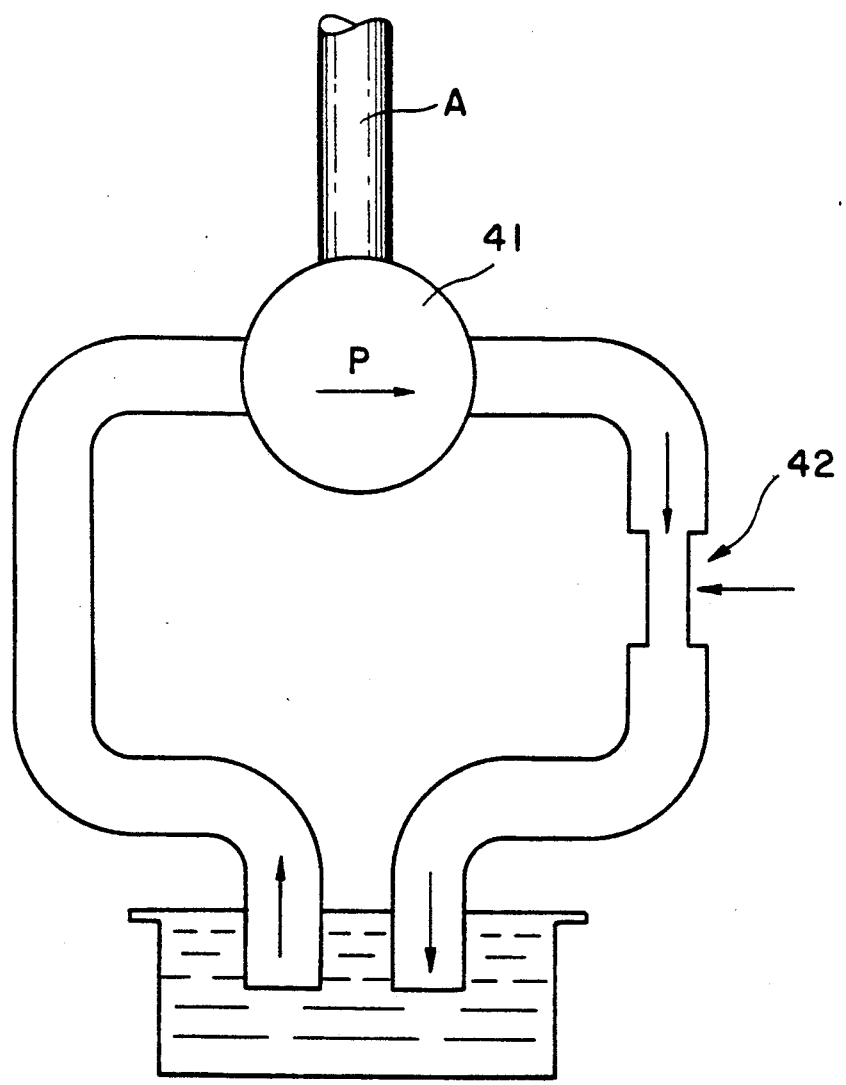
FIG. 4 is a view of another brake mechanism according to the present invention.

FIG. 4 shows another brake mechanism according to the present invention.

A shaft A to be braked corresponds to the rotatable shaft of the drive pinion of the differential 23 shown in FIG. 1. A hydraulic pump 41 is directly connected to the shaft A and actuatable thereby. The hydraulic pump 41 has an inlet port connected to an oil tank and an outlet port connected to the oil tank through a variable restriction or resistance 42. The hydraulic pump 41 and the variable restriction 42 jointly serve as a hydraulic damper for dampening the rotation of the shaft A.

Operation of the brake mechanism shown in FIG. 4 is as follows:

When the motor vehicle is not braked, i.e., the brake mechanism is not actuated, the variable restriction 42 is opened to its maximum opening to minimize the resistance to the flow of working oil from the pump 41 to the tank. Since the working oil discharged from the pump 41 flows to the tank unobstructedly, no substantial energy is consumed by the pump 41. Therefore, no braking force is applied to the shaft A by the pump 41.

To brake the shaft A, a control signal is applied to the variable restriction 42 to gradually close the passage therethrough of the working oil. Therefore, the resistance to the flow of working oil discharged from the pump 41 is increased. Since the pump 41 has to discharge working oil in opposition to the resistance presented by the variable restriction 42, substantial energy is consumed by the pump 41. Inasmuch as the consumed energy comes from the rotative power of the shaft A, the pump 41 serves to apply a braking force to the shaft A.

The braking force can be controlled by increasing or decreasing the resistance of the variable restriction 42 to the flow of working oil discharged from the pump 41. Consequently, when a large braking force is required, the resistance to the flow of working oil may be increased, and when a small braking force is required, the resistance to the flow of working oil may be reduced.

The hydraulic pump 41 may comprise a rotary-type pump, a reciprocating-type pump, or any of various other hydraulic pumps.

Although certain preferred embodiments have been shown and described, it should be understood that many changes and modifications may be made therein without departing from the scope of the appended claims.

What is claimed is:

1. A brake system in a motor vehicle having a pair of laterally spaced road wheels, comprising:
   a differential interconnecting the road wheels, said differential including two sun gears coupled respectively to the road wheels, and a planet gear meshing with said sun gears, said planet gear connected to a rotatable ring gear,
   a differential shaft meshing with said rotatable ring gear of said planet gear; and
   braking means comprising a clutch and a turbine coupled to said differential shaft through said clutch.

2. A brake system according to claim 1, wherein said turbine has a rotatable shaft, said braking means further including a gear train through which said rotatable shaft of said turbine is connected to said differential shaft.

3. A brake system according to claim 1, wherein said motor vehicle has two pairs of laterally spaced road wheels, including a pair of differential interconnecting the road wheels in the respective pairs.

* * * * *